US012571979B2

(12) United States Patent
Hsueh et al.

(10) Patent No.: US 12,571,979 B2
(45) Date of Patent: Mar. 10, 2026

(54) LENS DEVICE COMPRISING A GUIDING UNIT FOR GUIDING A LENS GROUP TO MOVE IN A FIRST DIRECTION OR SECOND DIRECTION

(71) Applicants: Sintai Optical (Shenzhen) Co., Ltd., ShenZhen City (CN); Asia Optical Co., Inc., Taichung (TW)

(72) Inventors: Chun-Yu Hsueh, Taichung (TW); Chun-Hung Huang, Taichung (TW); Tsung-Tse Chen, Taichung (TW); Duen-Kwei Hwang, Taichung (TW)

(73) Assignees: SINTAI OPTICAL (SHENZHEN) CO., LTD., ShenZhen City (CN); ASIA OPTICAL CO., INC., Taichung (TW)

( * ) Notice: Subject to any disclaimer, the term of this patent is extended or adjusted under 35 U.S.C. 154(b) by 662 days.

(21) Appl. No.: 18/062,054

(22) Filed: Dec. 6, 2022

(65) Prior Publication Data

US 2023/0228964 A1    Jul. 20, 2023

(30) Foreign Application Priority Data

Jan. 18, 2022    (TW) ................................... 111102035
Jan. 21, 2022    (TW) ................................... 111102649

(51) Int. Cl.
*G02B 7/02*    (2021.01)

(52) U.S. Cl.
CPC .................................... *G02B 7/021* (2013.01)

(58) Field of Classification Search
None
See application file for complete search history.

(56) References Cited

U.S. PATENT DOCUMENTS

| | | | |
|---|---|---|---|
| 2004/0207745 A1 | 10/2004 | Tsuruta et al. | |
| 2005/0286352 A1* | 12/2005 | Inui | G02B 7/102 |
| | | | 369/44.14 |
| 2008/0252998 A1 | 10/2008 | Miyazawa et al. | |
| 2013/0236166 A1 | 9/2013 | Enomoto et al. | |
| 2021/0072617 A1 | 3/2021 | Park et al. | |

FOREIGN PATENT DOCUMENTS

| | | | | |
|---|---|---|---|---|
| CN | 103309130 A | 9/2013 | | |
| CN | 105556946 A | * 5/2016 | ............. | G02B 7/023 |
| CN | 113132599 A | 7/2021 | | |
| CN | 113422898 A | 9/2021 | | |
| CN | 113820909 A | 12/2021 | | |
| IN | 113132599 A | 7/2021 | | |
| JP | 2013024938 A | * 2/2013 | ........... | H04N 23/687 |
| TW | M350036 U | 2/2009 | | |
| TW | M358330 U | 6/2009 | | |

* cited by examiner

*Primary Examiner* — Paul C Lee
(74) *Attorney, Agent, or Firm* — McClure, Qualey & Rodack, LLP

(57) ABSTRACT

A lens device includes a lens group unit, a guiding unit, a transmission unit and a driving unit. The guiding unit is connected to the lens group unit for guiding the lens group unit to move in a first direction or in a second direction. The transmission unit includes a fixing element. The driving unit is connected to the transmission unit so as to output power for driving the lens group unit through the transmission unit to move in the first direction X or in the second direction. The fixing element includes a body portion and a bent portion, and the bent portion extends from the body portion to form a space between the fixing element and the lens group unit.

20 Claims, 13 Drawing Sheets

LENS DEVICE COMPRISING A GUIDING UNIT FOR GUIDING A LENS GROUP TO MOVE IN A FIRST DIRECTION OR SECOND DIRECTION

BACKGROUND OF THE INVENTION

Field of the Invention

The invention relates to a lens device, and more particularly to a lens device capable of avoiding from damage caused by an external impact and being waterproof.

Description of the Related Art

Under a consideration of miniaturization, a cell phone is generally provided with plural lenses to perform zooming operation. However, such arrangement affects the appearance of the cell phone in aesthetics. Besides, the zoom range is still in limit. Therefore, recent developments have been towards a cell phone provided with an extension lens in order to improve the zoom range and the appearance. However, providing an extension lens with simple structure for a cell phone to perform zooming operation is a significant issue. Also, the design of an extension lens that is able to avoid from external water (e.g. rain water) is a challenge.

Further, a conventional lens device has no effective protection means against an external impact. Therefore, a conventional lens device is liable to damage when falling down to the ground.

BRIEF SUMMARY OF THE INVENTION

The invention provides a solution to address the described drawbacks. The lens device of the invention is provided with simple structure for moving the lens group unit.

The lens device in accordance with an exemplary embodiment of the invention includes a lens group unit, a guiding unit, a transmission unit and a driving unit. The guiding unit is connected to the lens group unit for guiding the lens group unit to move in a first direction or in a second direction. The transmission unit includes a fixing element. The driving unit is connected to the transmission unit so as to output power for driving the lens group unit through the transmission unit to move in the first direction X or in the second direction. The fixing element includes a body portion and a bent portion, and the bent portion extends from the body portion to form a space between the fixing element and the lens group unit.

In another exemplary embodiment, the lens device further includes a lens housing configured to contain the lens group unit, and a cushion unit connected between the lens group unit and the transmission unit, and disposed in the space. The lens group unit is extended from the lens housing when moved in the first direction, and the lens group unit is retracted into the lens housing when moved in the second direction. The lens group unit is driven by the driving unit through the transmission unit and the cushion unit to move in the first direction. When the lens group unit sustains an external impact, the external impact is transmitted through the lens group unit to the cushion unit.

In yet another exemplary embodiment, the transmission unit further includes a screw rod, the fixing element is a nut element connected to the screw rod through threads, and the driving unit outputs power for rotating the screw rod so that the fixing element is driven to move in the first direction or in the second direction.

In another exemplary embodiment, the lens device further includes an auxiliary unit connected between the lens group unit and the lens housing, wherein the auxiliary unit operates with the cushion unit to move the lens group unit in the first direction, and the first direction is opposite to the second direction.

In yet another exemplary embodiment, the lens group unit includes an optical axis, and the first direction and the second direction are parallel to the optical axis.

In another exemplary embodiment, when the driving unit outputs power to the transmission unit, the body portion contacts and exerts a force to the lens group unit so that the lens group unit is moved in the second direction.

In yet another exemplary embodiment, the lens group unit includes a contact portion. The fixing element is a nut element. The body portion contacts and exerts a force to the contact portion of the lens group unit so that the lens group unit is moved in the second direction. The body portion includes a threaded hole. The contact portion includes a through hole. The screw rod is penetrated through the threaded hole and the through hole.

In another exemplary embodiment, the lens group unit includes a contact portion. When the driving unit outputs power to the transmission unit, the body portion contacts and exerts a force to the contact portion of the lens group unit so that the lens group unit is moved in the second direction. The contact portion includes an opening. The cushion unit is penetrated through the opening.

In yet another exemplary embodiment, the fixing element is a nut element, the body portion includes a threaded hole, the contact portion includes an opening, and the screw rod is penetrated through the threaded hole and the opening.

In another exemplary embodiment, the nut element includes a first connecting portion. The lens group unit includes a second connecting portion. The first connecting portion extends in a third direction. The second connecting portion extends in a fourth direction or in a fifth direction. The third direction is perpendicular to the fourth direction. The third direction is opposite to the fifth direction. The cushion unit includes a spring. An end of the spring is connected to the first connecting portion and another end of the spring is connected to the second connecting portion.

In yet another exemplary embodiment, the lens device further includes a lens housing and a soft element. The lens housing includes a hole. The lens group unit is movably disposed in the lens housing to be extended from the lens housing or to be retracted into the lens housing. The lens group unit includes a lens barrel. A gap is formed between an outer circumferential wall of the lens barrel and an inner side surface of the hole. The soft element is disposed between the lens housing and the lens barrel.

In another exemplary embodiment, the lens housing includes a cover and a main body; wherein the driving unit and the main body are integrally formed into a continuous-unity piece, or the cover and the soft element are integrally formed into a continuous-unity piece.

In yet another exemplary embodiment, the cover and the main body are connected to form a storage space in which the lens group unit is disposed, and the hole is disposed on the cover.

In another exemplary embodiment, the soft element is silica gel, a rubber element, glue water, or soft plastic.

In yet another exemplary embodiment, the soft element includes a body, a first flange extending from the body towards the lens barrel, and a second flange extending from the body to be distant from the lens barrel. The first flange is propped against the lens barrel. The second flange is disposed in contact with the lens housing.

In another exemplary embodiment, the soft element further includes another first flange. The first flanges extend from the body towards the lens barrel. The first flanges are slanted with respect to a surface of the lens barrel. The soft element is held by the lens housing and the lens barrel.

In yet another exemplary embodiment, the soft element further includes another first flange. The first flanges extend from the body towards the lens barrel. The first flanges are perpendicular to a surface of the lens barrel. The soft element is held by the lens housing and the lens barrel.

In another exemplary embodiment, the soft element further includes another first flange. The first flanges extend from the body and in different directions. The soft element is held by the lens housing and the lens barrel.

In yet another exemplary embodiment, the soft element further includes another first flange. The soft element and the first flanges are annular to surround the lens barrel. The first flanges have cross sections that are substantially arranged into a shape of lower case letter lambda or are V-shaped.

In another exemplary embodiment, the soft element further includes another first flange. The soft element and the first flanges are annular to surround the lens barrel. The first flanges have cross sections that are splayed without directly connecting to each other.

Practicing the lens device of the invention has the following merits: the lens device has simple structure to move the lens group unit. When falling down to the ground, the lens device is protected well. Further, the lens device is effectively protected from external water.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The purpose, technical scheme and merits of the invention can be more fully understood by reading the subsequent detailed description and embodiments with references made to the accompanying drawings. However, it is understood that the subsequent detailed description and embodiments are only used for describing the invention. The invention is not limited thereto.

Figure 1:
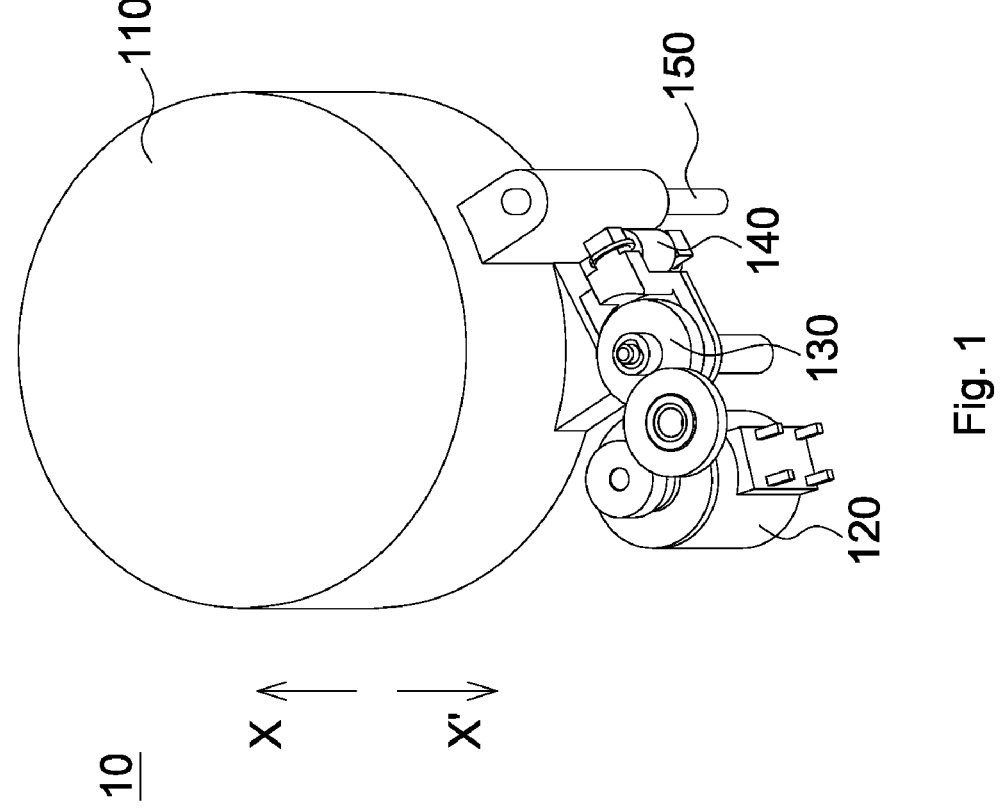
FIG. 1 is a schematic view showing the structure of a lens device in accordance with a first embodiment of the invention.
Figure 2:
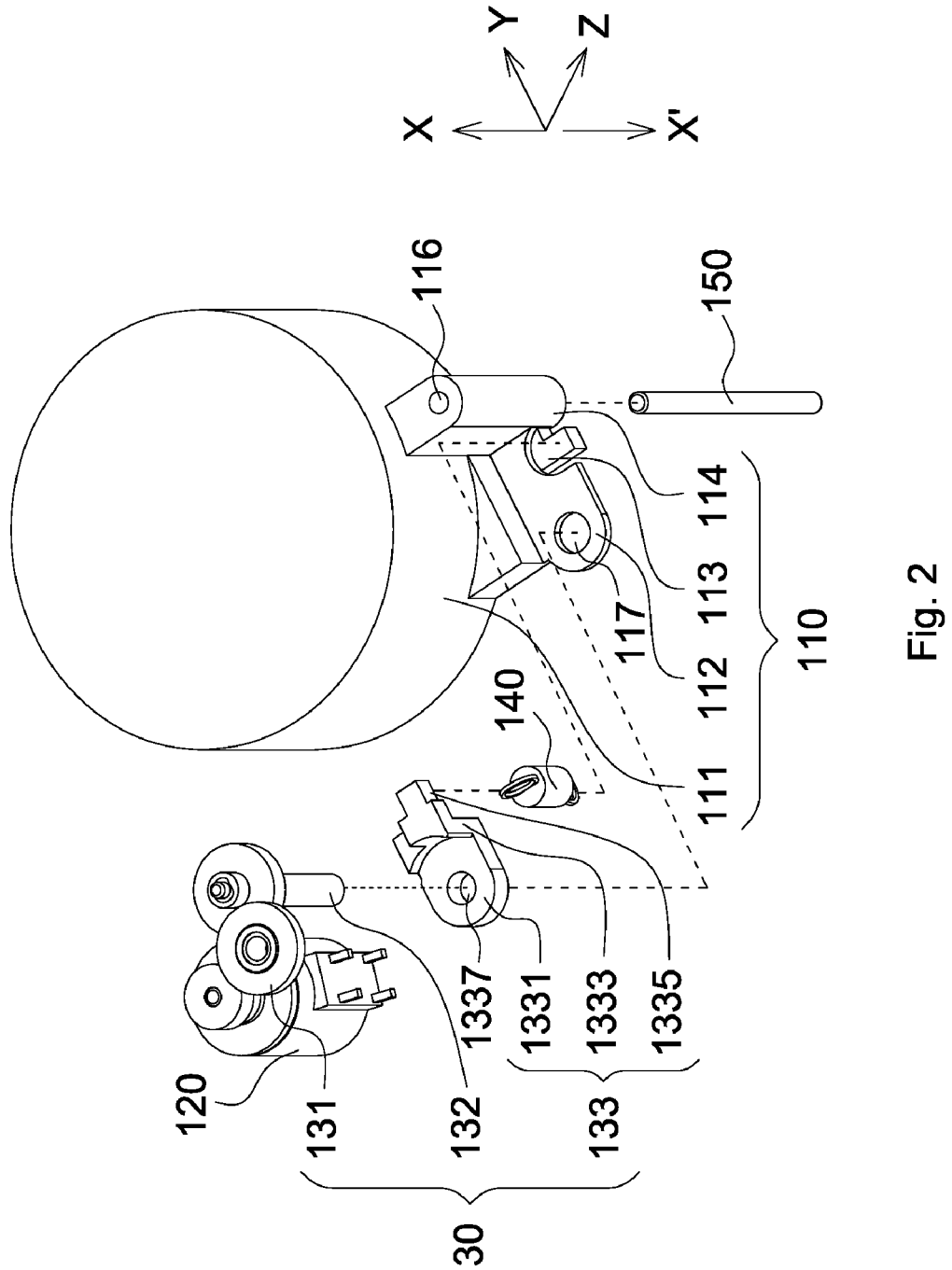
FIG. 2 is an exploded view of the lens device of FIG. 1.

Referring to FIGS. 1 and 2, FIG. 1 is a schematic view showing the structure of a lens device 10 in accordance with a first embodiment of the invention, and FIG. 2 is an exploded view of the lens device 10 of FIG. 1. As shown, the lens device 10 of the invention includes a lens housing (not shown) configured to contain a lens group unit 110, a driving unit 120, a transmission unit 130, a cushion unit 140 and a guiding unit 150. All the elements are described in detail below.

The lens group unit 110 includes at least one lens group (not shown) disposed in a lens barrel 111. A shaft sleeve 114 is provided on the circumferential surface of the lens barrel 111, extends in a first direction X or in a second direction X', and has a shaft hole 116. A contact portion 112 is flat, is connected to the shaft sleeve 114, and has a through hole 117. A second connecting portion 113 is a block-like protrusion that extends from the contact portion 112 in a fourth direction Z. The second direction X' is opposite to the first direction X. The fourth direction Z is perpendicular to the first direction X and the second direction X'.

The guiding unit 150 includes a guiding rod that is penetrated through the shaft hole 116 of the shaft sleeve 114 for guiding the lens group unit 110 to move in the first direction X or in the second direction X'.

The transmission unit 130 includes a gear train 131, a screw rod 132 and a fixing element 133. The fixing element 133 may be a nut element or any element provided for the cushion unit 140 to be fixed. The fixing element 133 includes a body portion 1331 provided with a threaded hole 1337, a bent portion 1333 extending from the body portion 1331, and a first connecting portion 1335 extending from the bent portion 1333 and in a third direction Y. The body portion 1331 is disposed in contact with a contact portion 112 of the lens group unit 110. It is worth noting that a space is formed between the first connecting portion 1335 of the fixing element 133 and the second connecting portion 113 of the lens group unit 110 because of the bent portion 1333 extending from the body portion 1331. The space is formed to contain the cushion unit 140 as shown in FIG. 1. The screw rod 132 is fixed to the gear train 131 and is penetrated through the threaded hole 1337 and the through hole 117.

In this embodiment, the cushion unit 140 includes at least one spring. The spring has an end connected to the first connecting portion 1335 of the fixing element 133, and another end connected to the second connecting portion 113 of the lens group unit 110. The first connecting portion 1335 extends in the third direction Y and the second connecting portion 113 extends in a fourth direction Z. The third direction Y is perpendicular to the fourth direction Z. Therefore, an accidental disconnection of the spring from the first connecting portion 1335 and the second connecting portion 113 can be prevented.

In this embodiment, the driving unit 120 is a motor that outputs power for driving the lens group unit 110 through the transmission unit 130 and the cushion unit 140 to move in the first direction X or for driving the lens group unit 110 through the transmission unit 130 to move in the second direction X', described below in detail.

Figure 3:
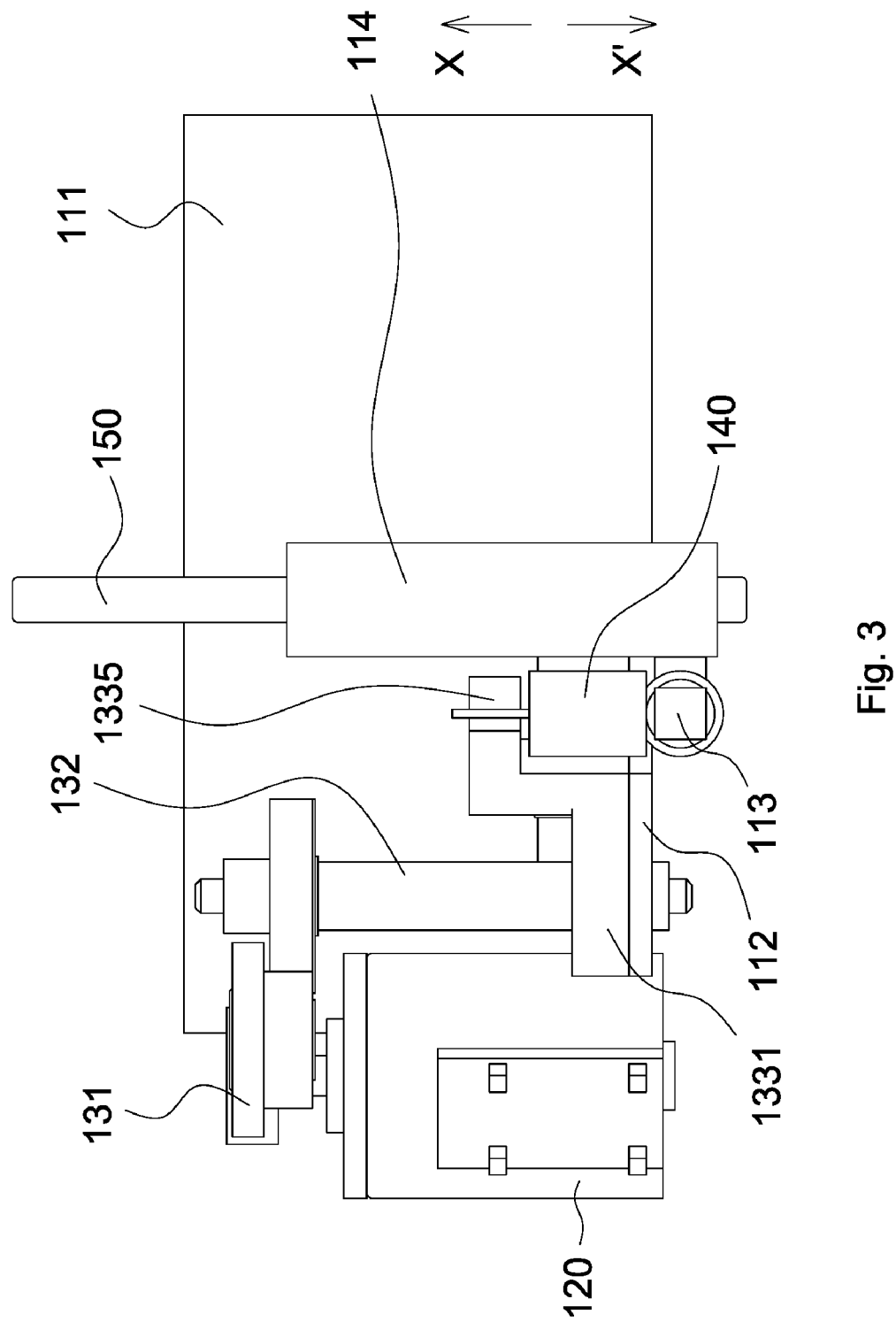
FIG. 3 is a front view of the lens barrel of the lens device of FIG. 1 wherein the lens barrel is at the lowest location.

Referring to FIG. 3, FIG. 3 is a front view of lens barrel 111 of the lens device 10 of FIG. 1 wherein the lens barrel 111 is retracted into the lens housing (not shown) and is at the lowest location. The driving unit 120 outputs power to rotate the screw rod 132 through the gear train 131. The fixing element 133 is constrained from rotating by ambient structure in the lens housing (not shown) and therefore can be only moved along the screw rod 132 in the first direction X. As described, the cushion unit 140 has an end connected to the first connecting portion 1335 of the fixing element 133, and another end connected to the second connecting portion 113 of the lens group unit 110. Therefore, the fixing element 133, when moved in the first direction X, is able to pull the lens barrel 111 through the cushion unit 140 and the second connecting portion 113 to move in the first direction X until the lens barrel 111 is extended from the lens housing (not shown) and reaches the highest location as shown in FIG. 4.

The lens device 10 may further include an auxiliary unit (not shown) for assisting the lens barrel 111 to move in the first direction X so that the movement of the lens barrel 111 becomes more stable and efficient. The auxiliary unit may be, for example, a compression spring or an extension spring that has an end directly or indirectly connected to the lens housing (not shown) and another end propped against or directly or indirectly connected to the lens group unit 110. By means of cooperation of the auxiliary unit (not shown) and the cushion unit 140, the movement of the lens group unit 110 is more stable and efficient.

When the driving unit 120 outputs power to reverse the rotation of the gear train 131, the screw rod 132 is reversely rotated to move the fixing element 133 along the screw rod 132 in the second direction X'. Then, the body portion 1331 of the fixing element 133 presses the contact portion 112 of the lens group unit 110, and the lens barrel 111 indirectly connected to the contact portion 112 is moved in the second direction X' until the lens barrel 111 is retracted into the lens housing (not shown) and returns to the lowest location as shown in FIG. 3.

Figure 4:
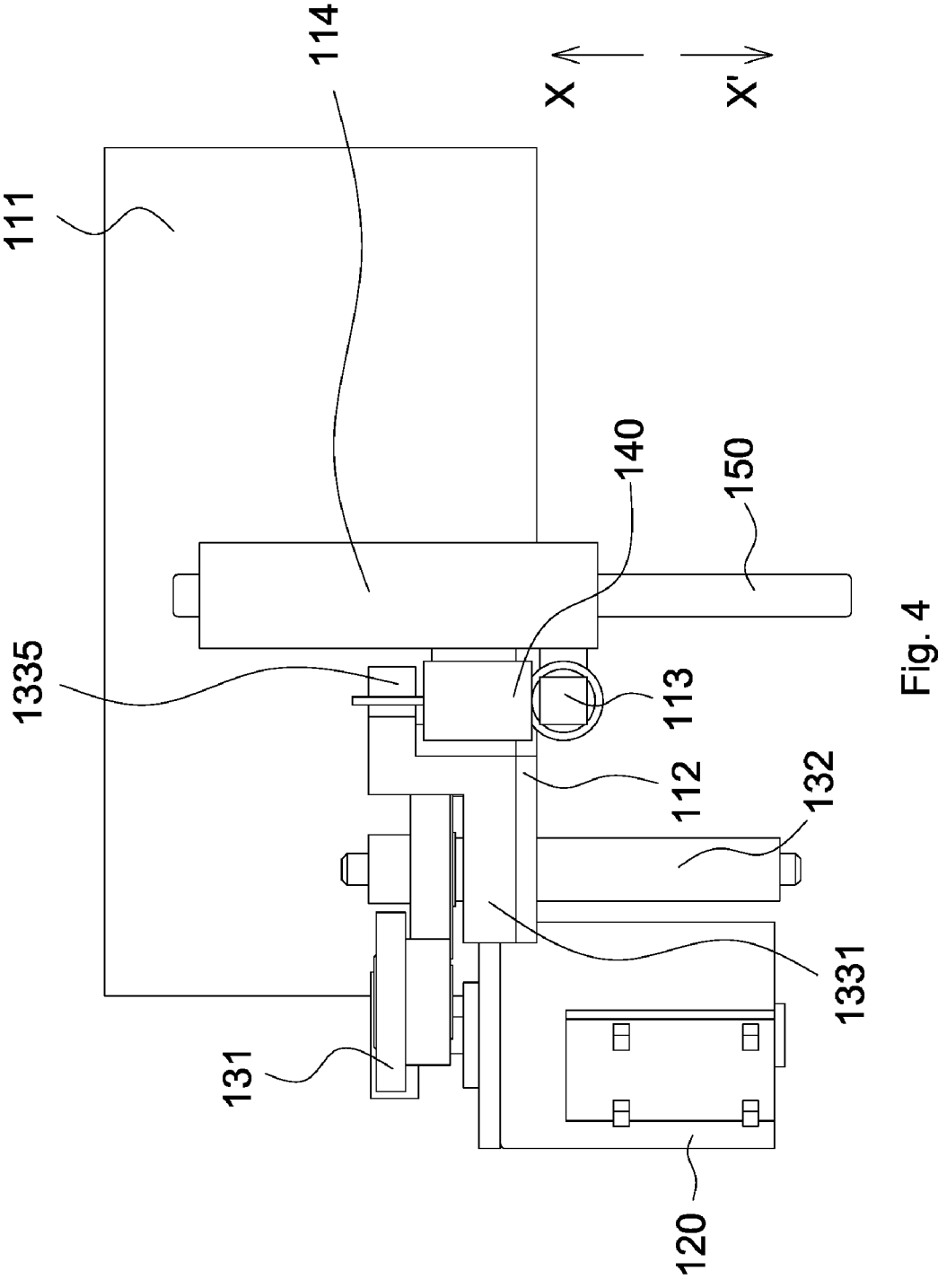
FIG. 4 is a front view of the lens barrel of the lens device of FIG. 1 wherein the lens barrel is at the highest location.
Figure 5:
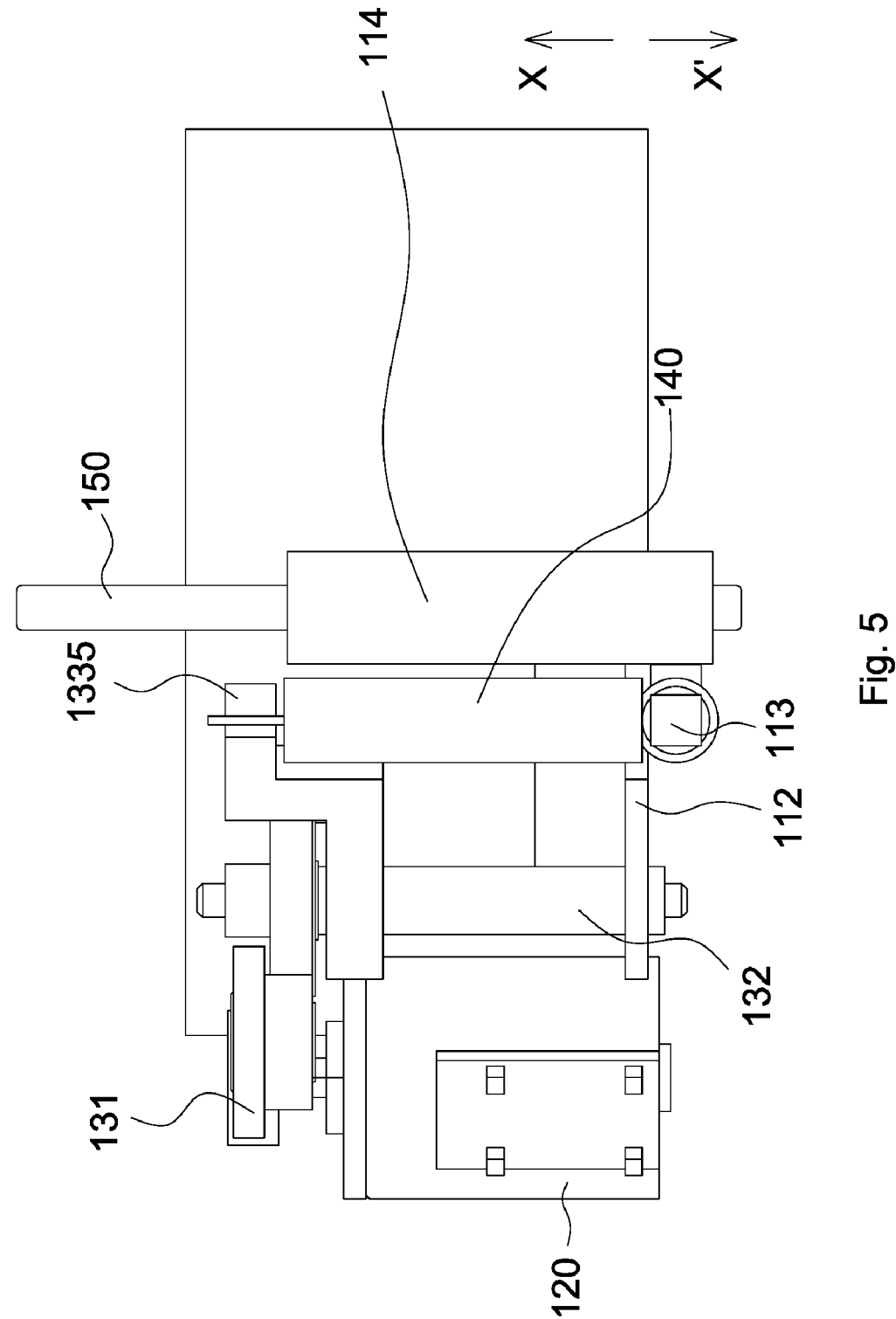
FIG. 5 is a front view of the lens barrel of the lens device of FIG. 1 wherein the lens barrel is under an external impact.

FIG. 4 depicts that the lens barrel 111 is extended from the lens housing (not shown). If the lens device 10 sustains an external impact (e.g. the lens device 10 falls down to the ground), the lens barrel will be retracted, the impact will be transmitted to the cushion unit 140 through the lens barrel 111, and the cushion unit (spring) 140 will absorb the impact via deformation as shown in FIG. 5. Such arrangement can avoid the lens group unit 110 from totally absorbing the impact, thereby protecting the lens group from damage.

Figure 6:
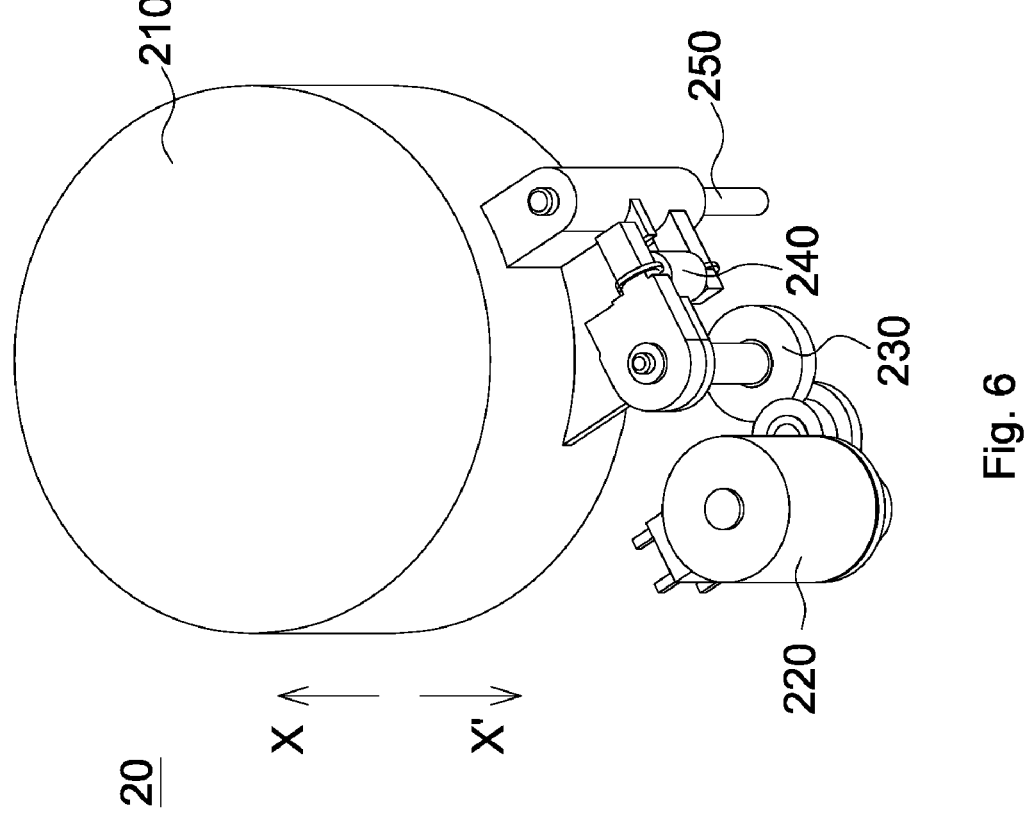
FIG. 6 is a schematic view showing the structure of a lens device in accordance with a second embodiment of the invention.
Figure 7:
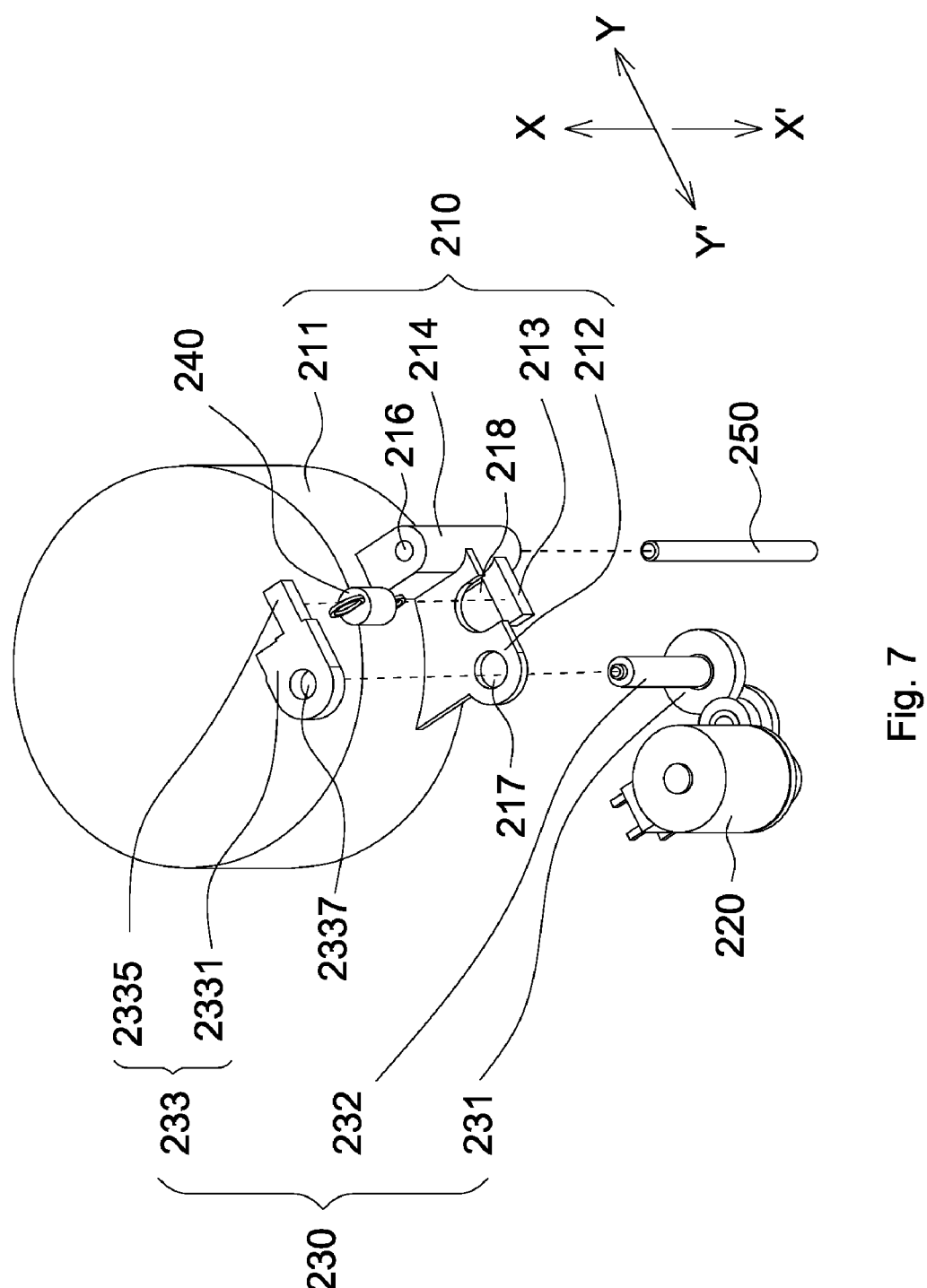
FIG. 7 is an exploded view of the lens device of FIG. 6.

Referring to FIGS. 6 and 7, FIG. 6 is a schematic view showing the structure of a lens device 20 in accordance with a second embodiment of the invention, and FIG. 7 is an exploded view of the lens device 20 of FIG. 6. As shown, the lens device 20 of the invention includes a lens housing (not shown) configured to contain a lens group unit 210, a driving unit 220, a transmission unit 230, a cushion unit 240 and a guiding unit 250. All the elements are described in detail below.

The lens group unit 210 includes at least one lens group (not shown) disposed in a lens barrel 211. A shaft sleeve 214 is provided on the circumferential surface of the lens barrel 211, extends in the first direction X or in the second direction X', and has a shaft hole 216. A contact portion 212 is flat, is connected to the shaft sleeve 214 and the circumferential surface of the lens barrel 211, and has a through hole 217 and an opening 218. The opening 218 is disposed closer to the shaft sleeve 214 than the through hole 217. It is worth noting that the opening 218 of the contact portion 212 is provided for arrangement of the cushion unit 240 (as shown in FIG. 6). A second connecting portion 213 is a block-like protrusion that extends from the shaft sleeve 214 in a fifth direction Y'. The second direction X' is opposite to the first direction X. The fifth direction Y' is perpendicular to the first direction X and the second direction X'.

The guiding unit 250 includes a guiding rod that is penetrated through the shaft hole 216 of the shaft sleeve 214 for guiding the lens group unit 210 to move in the first direction X or in the second direction X'.

The transmission unit 230 includes a gear train 231, a screw rod 232 and a fixing element 233. The fixing element 233 is flat and includes a body portion 2331 provided with a threaded hole 2337, and a first connecting portion 2335 extending from the body portion 2331 and in the third direction Y. The body portion 2331 is disposed in contact with a contact portion 212 of the lens group unit 210. The screw rod 232 is fixed to the gear train 231 and is penetrated through the threaded hole 2337 and the through hole 217.

In this embodiment, the cushion unit 240 has at least one spring. The spring has an end connected to the first connecting portion 2335 of the fixing element 233, and another end connected to the second connecting portion 213 of the lens group unit 210. The first connecting portion 2335 extends in the third direction Y and the second connecting portion 213 extends in a fifth direction Y'. The third direction Y is opposite to the fifth direction Y'. Therefore, an accidental disconnection of the spring from the first connecting portion 2335 and the second connecting portion 213 can be prevented.

In this embodiment, the driving unit 220 is a motor that outputs power for driving the lens group unit 210 through the transmission unit 230 and the cushion unit 240 to move in the first direction X or for driving the lens group unit 210 through the transmission unit 230 to move in the second direction X', described below in detail.

Figure 8:
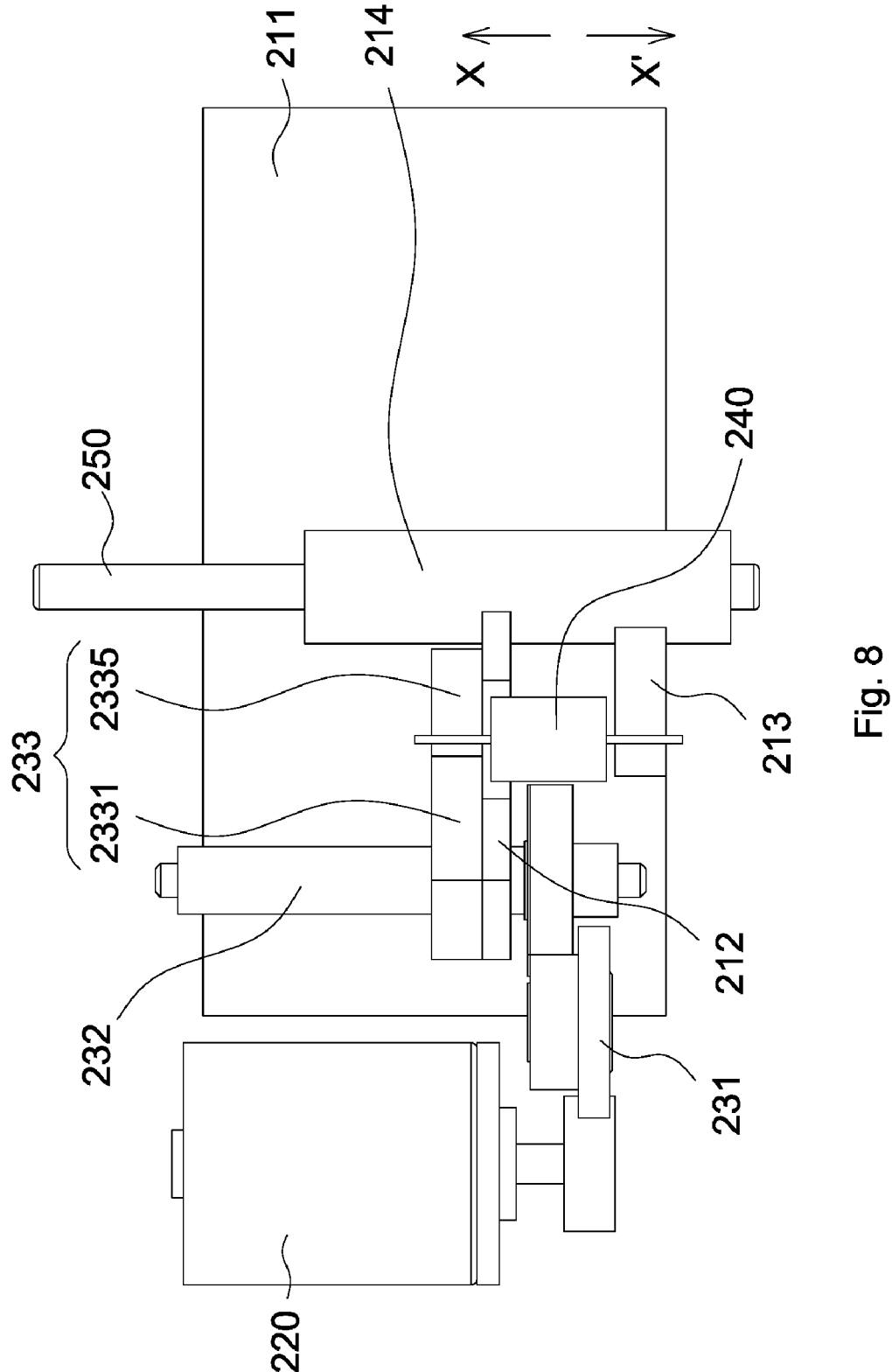
FIG. 8 is a front view of the lens barrel of the lens device of FIG. 6 wherein the lens barrel is at the lowest location.

Referring to FIG. 8, FIG. 8 is a front view of lens barrel 211 of the lens device 20 of FIG. 6 wherein the lens barrel 211 is retracted into the lens housing (not shown) and is at the lowest location. The driving unit 220 outputs power to rotate the screw rod 232 through the gear train 231. The fixing element 233 is constrained from rotating by ambient structure in the lens housing (not shown) and therefore is moved along the screw rod 232 in the first direction X. The fixing element 233, when moved in the first direction X, is able to pull the lens barrel 211 through the cushion unit 240 to move in the first direction X until the lens barrel 211 is extended from the lens housing (not shown) and reaches the highest location as shown in FIG. 9.

Similar to that of the first embodiment, the lens device 20 of the second embodiment may further include an auxiliary unit (not shown) for assisting the lens barrel 211 to move in the first direction X so that the movement of the lens barrel 211 becomes more stable and efficient. The auxiliary unit may be, for example, a compression spring or an extension spring that has an end directly or indirectly connected to the lens housing (not shown) and another end propped against or directly or indirectly connected to the lens group unit 210. By means of cooperation of the auxiliary unit (not shown) and the cushion unit 240, the movement of the lens group unit 210 is more stable and efficient.

When the driving unit 220 outputs power to reverse the rotation of the gear train 231, the screw rod 232 is reversely rotated to move the fixing element 233 along the screw rod 232 in the second direction X'. Then, the body portion 2331 of the fixing element 233 presses the contact portion 212 of the lens group unit 210, and the lens barrel 211 is moved in the second direction X' until the lens barrel 211 is retracted into the lens housing (not shown) and returns to the lowest location as shown in FIG. 8.

Figure 9:
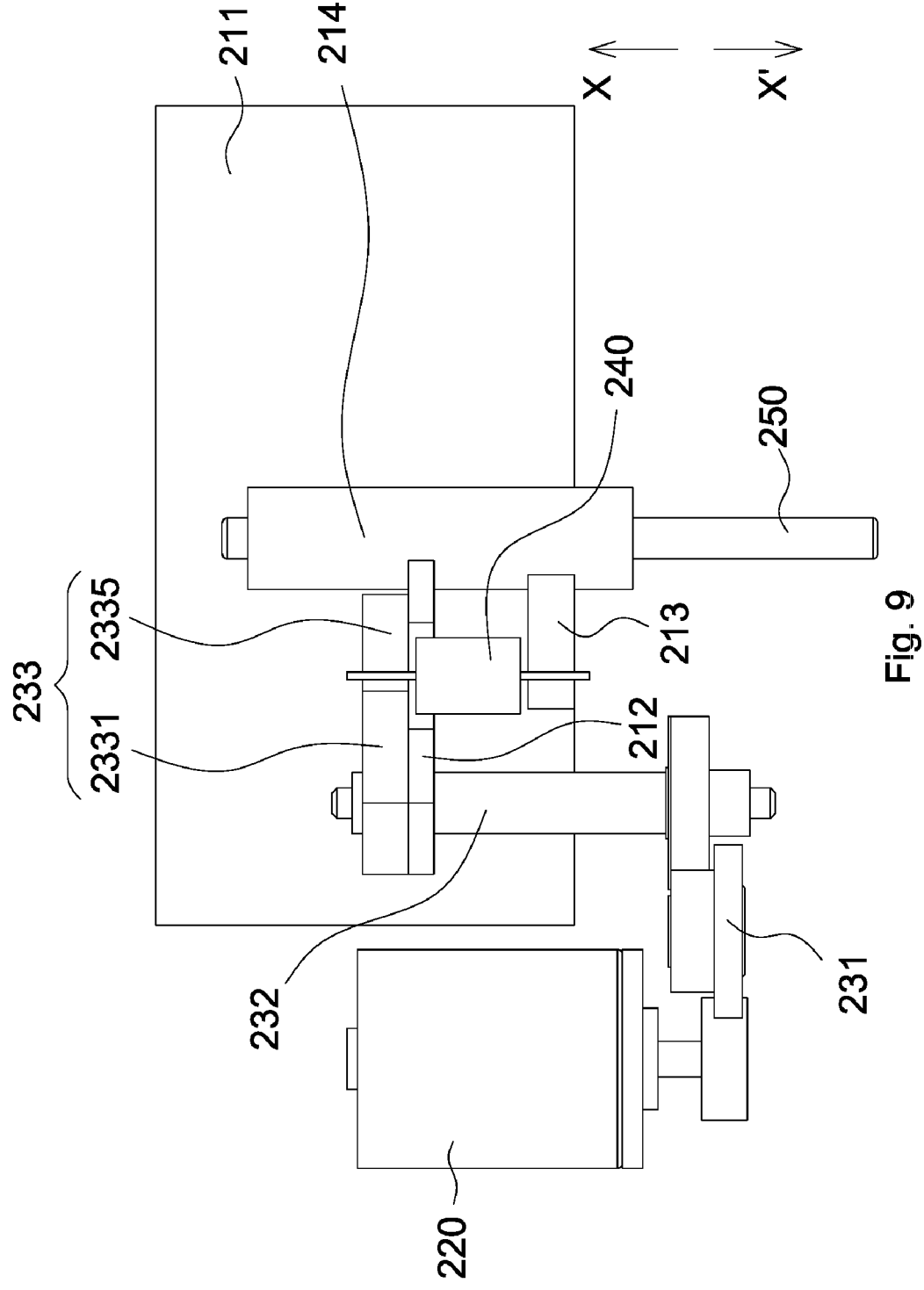
FIG. 9 is a front view of the lens barrel of the lens device of FIG. 6 wherein the lens barrel is at the highest location.
Figure 10:
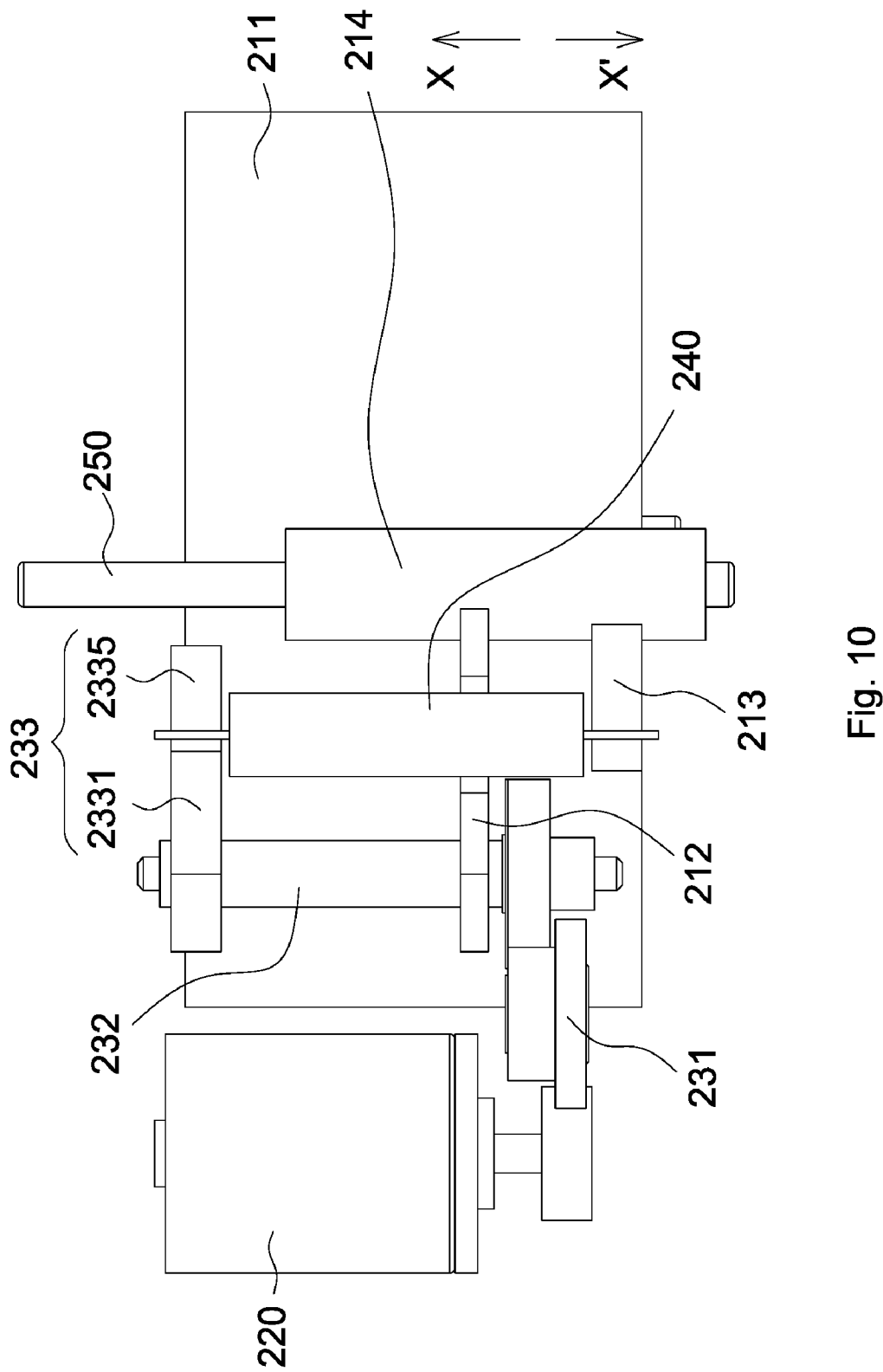
FIG. 10 is a front view of the lens barrel of the lens device of FIG. 6 wherein the lens barrel is under an external impact.

FIG. 9 depicts that the lens barrel 211 is extended from the lens housing (not shown). If the lens device 20 sustains an external impact, the lens barrel 211 will be retracted, the impact will be transmitted to the cushion unit 240 through the lens barrel 211, and the cushion unit (spring) 240 will absorb the impact via deformation as shown in FIG. 10. Such arrangement can avoid the lens group unit 210 from totally sustaining the impact, thereby protecting the lens group unit 210 from damage.

Figure 11:
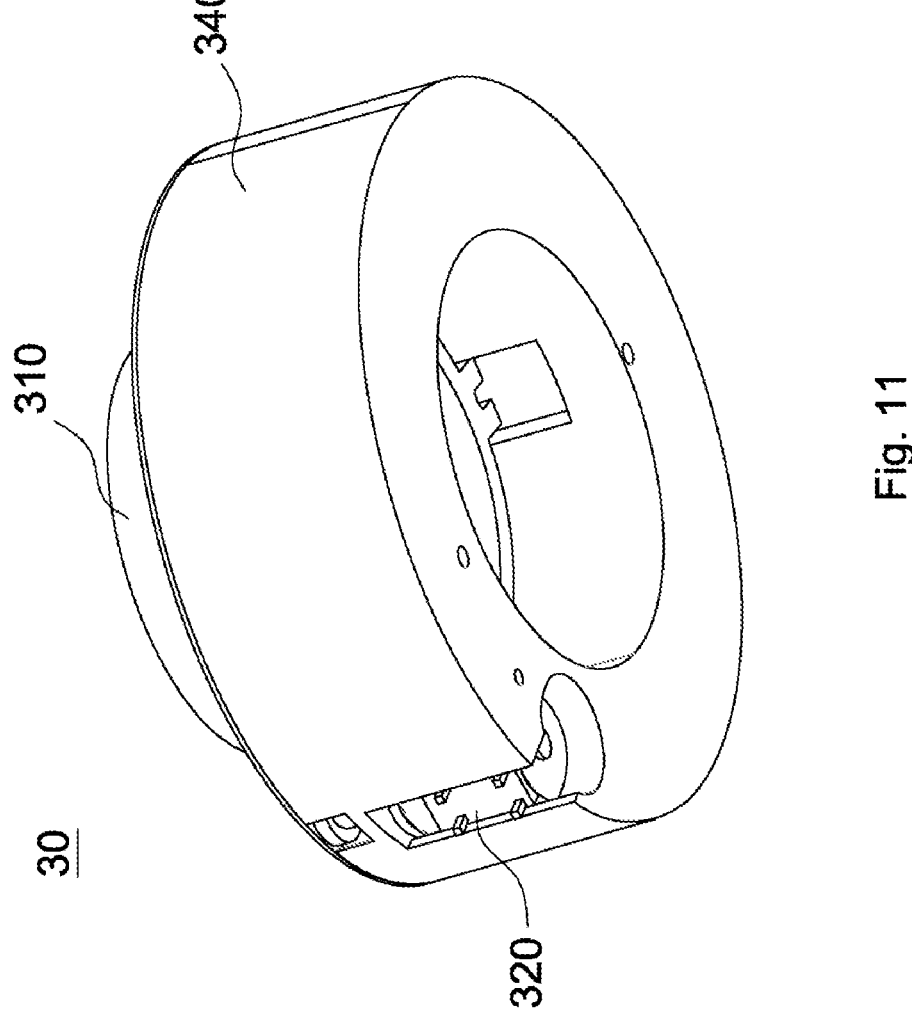
FIG. 11 is a schematic view showing the structure of a lens device in accordance with a third embodiment of the invention.
Figure 12:
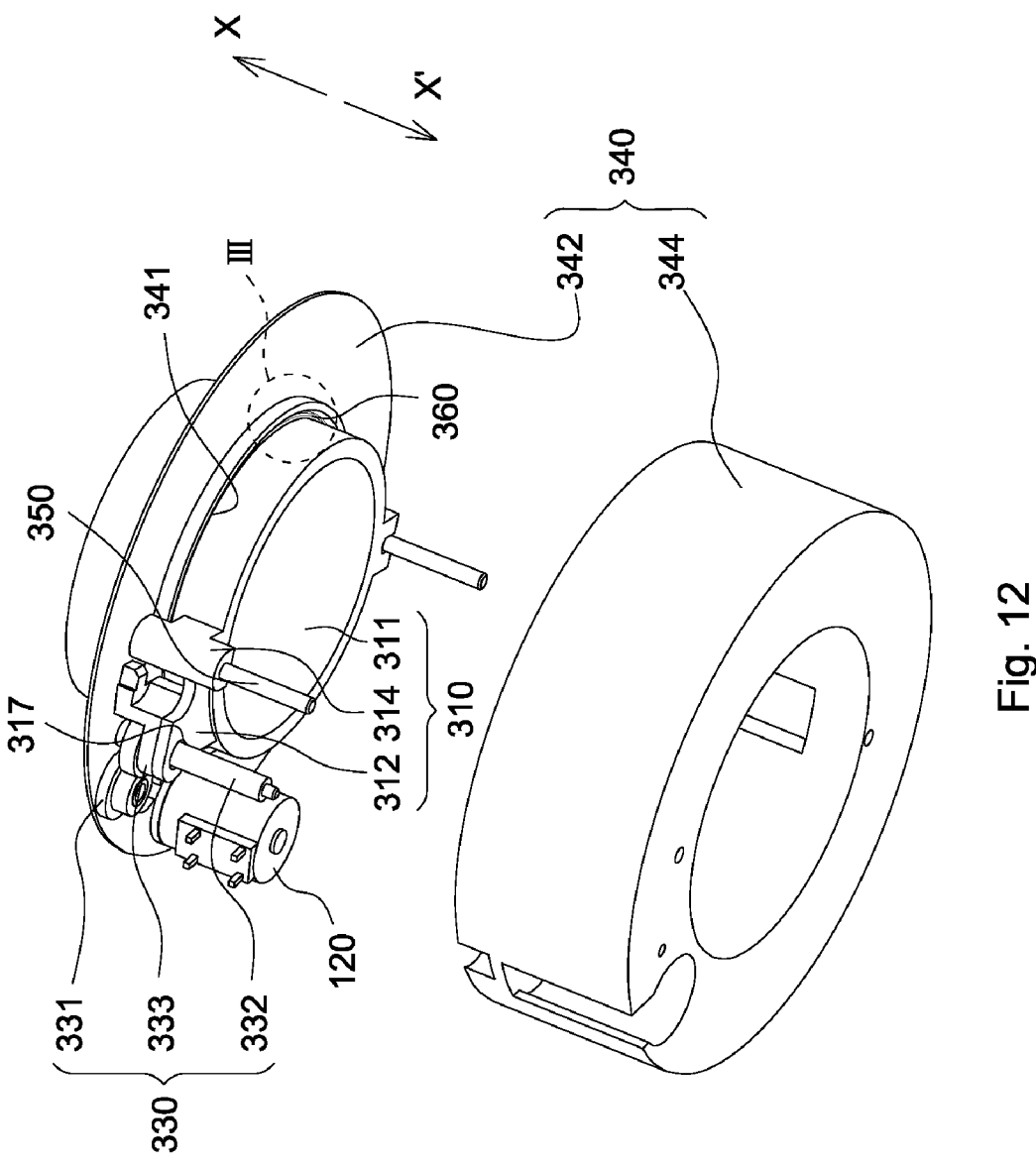
FIG. 12 is an exploded view of the lens device of FIG. 11.

Referring to FIGS. 11 and 12, FIG. 11 is a schematic view showing the structure of a lens device 30 in accordance with a third embodiment of the invention, and FIG. 12 is an exploded view of the lens device 30 of FIG. 11. As shown, the lens device 30 of the invention includes a lens housing 340. The lens housing 340 includes a cover 342 and a main body 344 connected to each other so as to form a storage space for containing the lens group unit 310, driving unit 320, transmission unit 330, and guiding unit 350. All the elements are described below in detail.

The cover 342 is provided with a hole 341 through which the lens group unit 310 can be extended from or retracted into the lens housing 340.

The lens group unit 310 has at least one lens group (not shown) disposed in the lens barrel 311 to form an optical axis. A shaft sleeve 314 is disposed on the outer circumferential wall of the lens barrel 311. A connecting portion 312 is flat, is connected to the shaft sleeve 314, and is provided with a through hole 317.

The guiding unit 350 includes a guiding rod that is penetrated through the shaft sleeve 314 for guiding the lens group unit 310 to move in the first direction X to be extended from the lens housing 340 or to move in the second direction X' to be retracted into the lens housing 340.

The transmission unit 330 includes a gear train 331, a screw rod 332 and a fixing element 333. The fixing element 333 is connected to the screw rod 332 through threads and is fixed to the connecting portion 312 of the lens group unit 310. The screw rod 332 is fixed to the gear train 331, is connected to the fixing element 333 through threads, and is penetrated through the through hole 317.

In this embodiment, the driving unit 320 is a motor that outputs power to rotate the screw rod 332 through the gear train 331. The fixing element 333 is constrained from rotating by ambient structure (not shown) in the lens housing 340 and therefore can be only moved along the screw rod 332 in the first direction X or in the second direction X'. The fixing element 333, when moved along the screw rod 332, is able to drive the lens group unit 310 through the connecting portion 312 to move in the first direction X so as to be extended from the lens housing 340 or to move in the second direction X' so as to be retracted into the lens housing 340.

Figure 13:
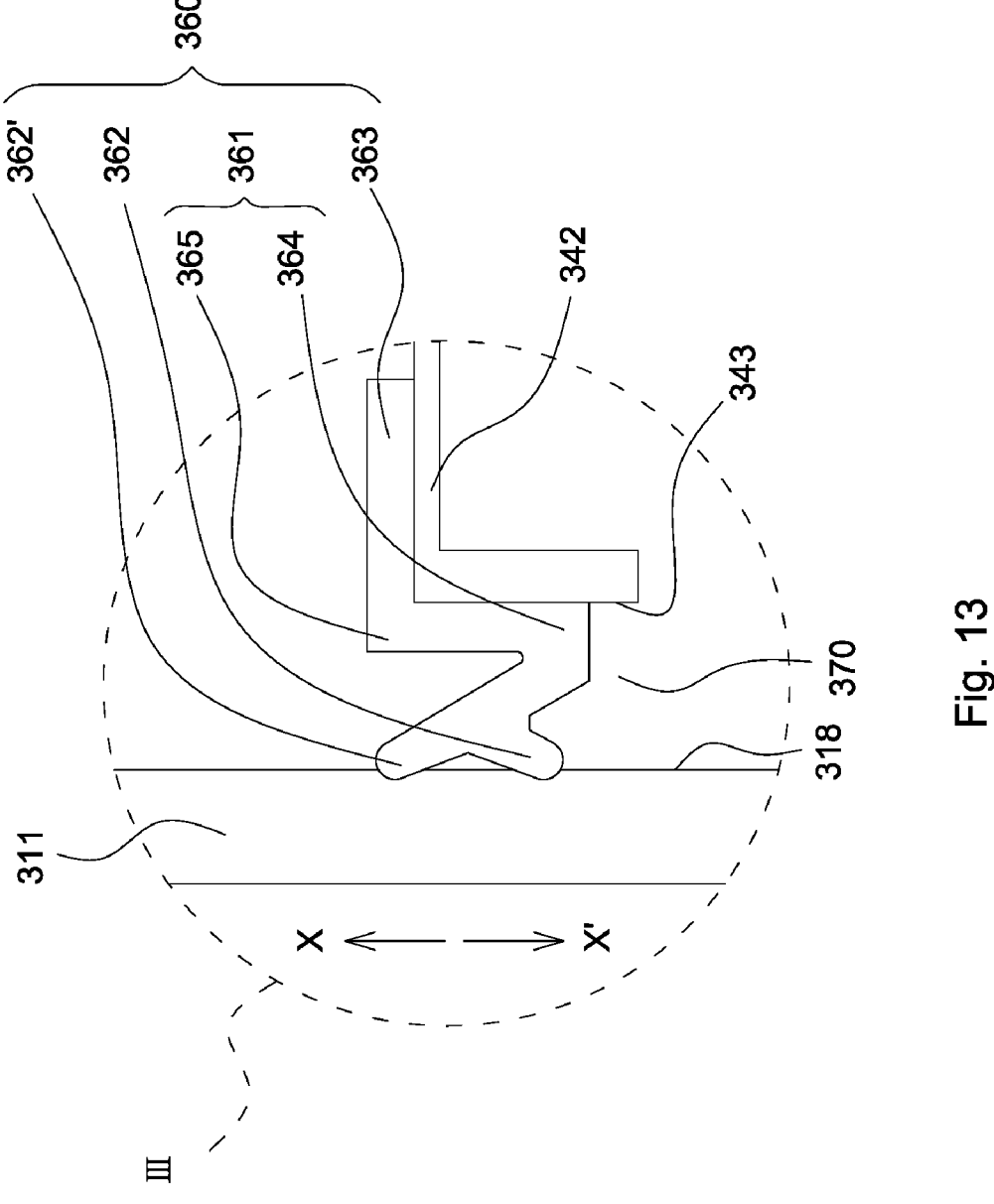
FIG. 13 is a sectional view showing a portion of the lens device that is encircled by a broken line in FIG. 12.

As described above, the lens group unit 310 includes the lens barrel 311. The lens housing 340 includes the cover 342 and the cover 342 is provided with the hole 341. Referring to FIG. 13, FIG. 13 is a sectional view showing a portion of the lens device that is encircled by a broken line in FIG. 12. As shown, a gap 370 is formed between the inner side surface 343 of the hole 341 and the outer circumferential wall 318 of the lens barrel 311. In the invention, a silica gel element 360 that is waterproof is disposed in the gap 370 and in contact with the cover 342 of the lens housing 340 and the lens barrel 311 of the lens group unit 310. Because of the elasticity and tightness, the silica gel element is able to closely contact the lens barrel 311 and the cover 342 when the lens group unit 310 is moved. External water, for example, rainwater, fails to enter the lens housing 340 through the gap 370 where the silica gel element 360 is disposed.

To achieve the waterproof purpose, the cover 342 is a continuous-unity piece instead of a combination of plural elements (plural elements must have gaps formed therebetween that is disadvantageous to the waterproof function). Preferably, the cover 342 and a soft element (e.g. the silica gel element 360, a rubber element, glue water, soft plastic or the like) is a continuous-unity piece. Further, the cover 342 has a fixing function for fixing the mechanism that includes the lens group unit 310, the driving unit 320, the transmission unit 330, the guiding unit 350 and others. A continuous-unity piece in structure is advantageous to the design of fool proofing and operation of alignment of elements during the assembly, and is provided with an axial positioning function. For the efficiency of assembly, therefore, the invention is superior to the prior art that requires a positioning operation and an aligning operation during assembly.

It is preferable that the driving unit 320 is disposed in or is connected to the main body 344, or the driving unit 320 and the main body 344 are integrally formed as a continuous-unity piece. In addition to the property of silica gel, the shape of the silica gel element 360 is used for enhancing the waterproof function in the invention, described below in detail.

The silica gel element 360 is annular and surrounds the lens barrel 311. As shown in FIG. 13, the silica gel element 360 includes a body 361, two first flanges 362, 362', and a second flange 363. The body 361 extends in the first direction X or in the second direction X' (i.e. in the direction of movement of the lens group unit 310), and includes a first end portion 364 and a second end portion 365 opposite to the first end portion 364. The first flanges 362, 362' extend from the first end portion 364 towards the lens barrel 311 and are propped against the lens barrel 311. It is worth noting that the first flanges 362, 362' are slanted with respect to the surface of the lens barrel 311. The cross sections of the first flanges 362, 362' are V-shaped or are substantially arranged into a shape of lower case letter lambda ($\lambda$). Further, the first flanges 362, 362' are arranged to surround the optical axis of the lens group unit 310. Therefore, an annular groove is formed by the first flanges 362, 362'. The second flange 363 extends from the second end portion 365 to be distant from the lens barrel 311 and contacts the cover 342 of the lens housing 340. When the lens group unit 310 is moved in the first direction X or in the second direction X', the first flanges 362, 362' sustain reaction forces from the lens barrel 311 that are able to enhance the tightness between the silica gel element 360 and the lens barrel 311.

When the lens group unit 310 is moved in the first direction X, the first flange 362 is moved against the lens barrel 311 and therefore the first flange 362 sustains a reaction force larger than the first flange 362' so that the tightness between the silica gel element 360 and the lens barrel 311 can be enhanced. In contrast, when the lens group unit 310 is moved in the second direction X', the first flange 362' is moved against the lens barrel 311 and therefore the first flange 362' sustains a reaction force larger than the first flange 362 so that tightness between the silica gel element 360 and the lens barrel 311 can be still kept.

In the third embodiment, the silica gel element 360 includes two first flanges 362, 362'. However, the invention is not limited thereto. The silica gel element may include one, three or more first flanges. It is also feasible that first flanges are not slanted with respect to the surface of the lens barrel but are perpendicular to the surface of the lens barrel.

Different shapes provide different extent of waterproofing. All belong to the category of the invention.

In the third embodiment, the first flanges 362, 362' are partly connected to be V-shaped or substantially form into a shape of lower case letter lambda (λ) in a cross section. However, the invention is not limited thereto. The first flanges 362, 362' may be modified to directly extend from the body 361. In other words, the first flanges have cross sections that are splayed without directly connecting to each other. Such arrangement can still provide good tightness and good waterproofing.

In the third embodiment, the lens device 30 may further include the cushion unit 140 of the first embodiment or the cushion unit 210 of the second embodiment. Either structure is already described above, and therefore the descriptions thereof are not repeated.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens device, comprising:
a lens group unit;
a guiding unit connected to the lens group unit for guiding the lens group unit to move in a first direction or in a second direction;
a transmission unit comprising a fixing element and a screw rod;
a driving unit connected to the transmission unit so as to output power for driving the lens group unit through the transmission unit to move in the first direction or in the second direction;
wherein the fixing element comprises a body portion and a bent portion, and the bent portion extends from the body portion to form a space between the fixing element and the lens group unit;
wherein the lens group unit comprises a contact portion;
wherein the body portion comprises a threaded hole;
wherein the contact portion comprises a through hole;
wherein the screw rod is penetrated through the threaded hole and the through hole.

2. The lens device as claimed in claim 1, further comprising:
a lens housing configured to contain the lens group unit;
a cushion unit connected between the lens group unit and the transmission unit, and disposed in the space;
wherein the lens group unit is extended from the lens housing when moved in the first direction, and the lens group unit is retracted into the lens housing when moved in the second direction;
wherein the lens group unit is driven by the driving unit through the transmission unit and the cushion unit to move in the first direction;
wherein when the lens group unit sustains an external impact, the external impact is transmitted through the lens group unit to the cushion unit.

3. The lens device as claimed in claim 1, wherein the fixing element is a nut element connected to the screw rod through threads, and the driving unit outputs power for rotating the screw rod so that the fixing element is driven to move in the first direction or in the second direction.

4. The lens device as claimed in claim 2, further comprising an auxiliary unit connected between the lens group unit and the lens housing, wherein the auxiliary unit operates with the cushion unit to move the lens group unit in the first direction, and the first direction is opposite to the second direction.

5. The lens device as claimed in claim 1, wherein the lens group unit comprises an optical axis, and the first direction and the second direction are parallel to the optical axis.

6. The lens device as claimed in claim 3, wherein when the driving unit outputs power to the transmission unit, the body portion contacts and exerts a force to the lens group unit so that the lens group unit is moved in the second direction.

7. The lens device as claimed in claim 6, wherein:
the fixing element is a nut element;
the body portion contacts and exerts a force to the contact portion of the lens group unit so that the lens group unit is moved in the second direction.

8. A lens device comprising:
a lens group unit;
a guiding unit connected to the lens group unit for guiding the lens group unit to move in a first direction or in a second direction;
a transmission unit comprising a fixing element;
a driving unit connected to the transmission unit so as to output power for driving the lens group unit through the transmission unit to move in the first direction or in the second direction;
a lens housing configured to contain the lens group unit;
a cushion unit connected between the lens group unit and the transmission unit, and disposed in the space;
wherein the fixing element comprises a body portion and a bent portion, and the bent portion extends from the body portion to form a space between the fixing element and the lens group unit;
wherein the lens group unit is extended from the lens housing when moved in the first direction, and the lens group unit is retracted into the lens housing when moved in the second direction;
wherein the lens group unit is driven by the driving unit through the transmission unit and the cushion unit to move in the first direction;
wherein when the lens group unit sustains an external impact, the external impact is transmitted through the lens group unit to the cushion unit;
wherein the lens group unit comprises a contact portion;
wherein when the driving unit outputs power to the transmission unit, the body portion contacts and exerts a force to the contact portion of the lens group unit so that the lens group unit is moved in the second direction;
wherein the contact portion comprises an opening;
wherein the cushion unit is penetrated through the opening.

9. The lens device as claimed in claim 8, wherein the fixing element is a nut element, the body portion comprises a threaded hole, the contact portion comprises an opening, and the screw rod is penetrated through the threaded hole and the opening.

10. The lens device as claimed in claim 7, wherein:
the nut element comprises a first connecting portion;
the lens group unit comprises a second connecting portion;
the first connecting portion extends in a third direction;
the second connecting portion extends in a fourth direction or in a fifth direction;
the third direction is perpendicular to the fourth direction;
the third direction is opposite to the fifth direction;

the cushion unit comprises a spring;

an end of the spring is connected to the first connecting portion and another end of the spring is connected to the second connecting portion.

11. The lens device as claimed in claim 1, further comprising a lens housing and a soft element;

wherein the lens housing comprises a hole;

wherein the lens group unit is movably disposed in the lens housing to be extended from the lens housing or to be retracted into the lens housing;

wherein the lens group unit comprises a lens barrel;

wherein a gap is formed between an outer circumferential wall of the lens barrel and an inner side surface of the hole;

wherein the soft element is disposed between the lens housing and the lens barrel.

12. The lens device as claimed in claim 11, wherein the lens housing comprises a cover and a main body; wherein the driving unit and the main body are integrally formed into a continuous-unity piece, or the cover and the soft element are integrally formed into a continuous-unity piece.

13. The lens device as claimed in claim 12, wherein the cover and the main body are connected to form a storage space in which the lens group unit is disposed, and the hole is disposed on the cover.

14. The lens device as claimed in claim 12, wherein the soft element is silica gel, a rubber element, glue water, or soft plastic.

15. A lens device comprising:

a lens group unit;

a guiding unit connected to the lens group unit for guiding the lens group unit to move in a first direction or in a second direction;

a transmission unit comprising a fixing element;

a driving unit connected to the transmission unit so as to output power for driving the lens group unit through the transmission unit to move in the first direction or in the second direction;

a lens housing;

a soft element;

wherein the fixing element comprises a body portion and a bent portion, and the bent portion extends from the body portion to form a space between the fixing element and the lens group unit;

wherein the lens housing comprises a hole;

wherein the lens group unit is movably disposed in the lens housing to be extended from the lens housing or to be retracted into the lens housing;

wherein the lens group unit comprises a lens barrel;

wherein a gap is formed between an outer circumferential wall of the lens barrel and an inner side surface of the hole;

wherein the soft element is disposed between the lens housing and the lens barrel;

wherein the lens housing comprises a cover and a main body;

wherein the driving unit and the main body are integrally formed into a continuous-unity piece, or the cover and the soft element are integrally formed into a continuous-unity piece;

wherein the soft element comprises a body, a first flange extending from the body towards the lens barrel, and a second flange extending from the body to be distant from the lens barrel;

wherein the first flange is propped against the lens barrel;

wherein the second flange is disposed in contact with the lens housing.

16. The lens device as claimed in claim 15, wherein:

the soft element further comprises another first flange;

the first flanges extend from the body towards the lens barrel;

the first flanges are slanted with respect to a surface of the lens barrel;

the soft element is held by the lens housing and the lens barrel.

17. The lens device as claimed in claim 15, wherein:

the soft element further comprises another first flange;

the first flanges extend from the body towards the lens barrel;

the first flanges are perpendicular to a surface of the lens barrel;

the soft element is held by the lens housing and the lens barrel.

18. The lens device as claimed in claim 15, wherein:

the soft element further comprises another first flange;

the first flanges extend from the body and in different directions;

the soft element is held by the lens housing and the lens barrel.

19. The lens device as claimed in claim 15, wherein:

the soft element further comprises another first flange;

the soft element and the first flanges are annular to surround the lens barrel;

the first flanges have cross sections that are substantially arranged into a shape of lower case letter lambda or are V-shaped.

20. The lens device as claimed in claim 15, wherein:

the soft element further comprises another first flange;

the soft element and the first flanges are annular to surround the lens barrel;

the first flanges have cross sections that are splayed without directly connecting to each other.

* * * * *